Figure 1:
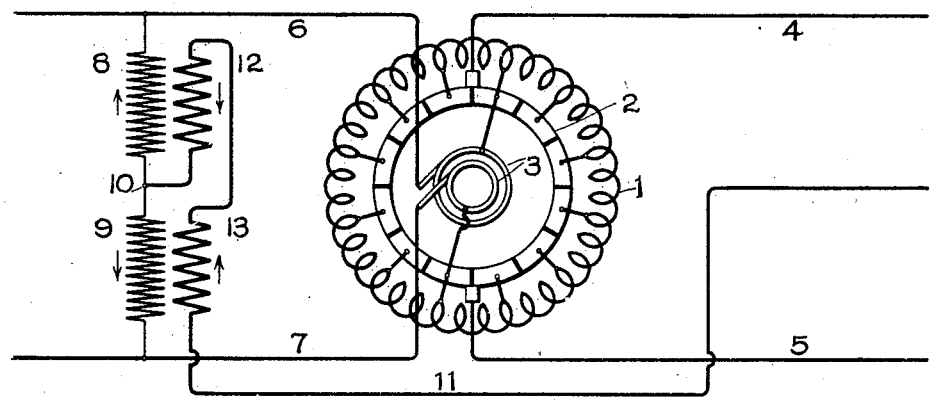

No. 664,106. Patented Dec. 18, 1900.
C. P. STEINMETZ.
SYSTEM OF ELECTRICAL DISTRIBUTION.
(Application filed Aug. 30, 1900.)

(No Model.)

Witnesses:
Lewis B. Abell
Benjamin B. Hull

Inventor:
Charles P. Steinmetz,
by Albert G. Davis
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 664,106, dated December 18, 1900.

Application filed August 30, 1900. Serial No. 28,597. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, (Case No. 1,761,) of which the following is a specification.

In dynamo-electric machines having commutators—such, for example, as rotary converters, double-current generators, continuous-current converters, &c.—it is frequently desirable to obtain a point having a potential neutral with respect to the distribution of potential about the winding to which the commutator is connected, thereby enabling the connection of a neutral conductor to this point. This neutral conductor may serve either as the neutral conductor of a three-wire system or as one side of a direct-current circuit used either for transmitting current to the machine or receiving current from the machine when the same is employed as a continuous-current converter. This point of neutral potential has often been obtained heretofore by the use of independent reactive coils having terminals joined to a common point constituting the point of neutral potential and with other terminals connected to suitably-spaced points in the armature-winding of the dynamo-electric machine. An example of this construction is the well-known Y connection of three reactive coils, the free terminals of which are connected in three-phase relation to the armature of a commutating-machine. The common connection of the reactive coils constitutes the point of neutral potential, from which a neutral conductor may be extended. I have found, however, that this arrangement is practically useless in cases where the neutral conductor is intended to carry an appreciable amount of current. In such a case the direct current flowing through the reactance-coils brings them up to or near the point of saturation of the iron, which saturation causes an excessive flow of magnetizing-current due to the alternating electromotive forces impressed upon the reactive coils by reason of their connection with the armature-winding of the commutating-machine. This excessive flow of magnetizing-current is generally so large as to reduce the efficiency of the system to a value lower than is permissible in practice, for which reason the arrangement may be considered as practically inoperative. In cases such as the one described I have found that the objection specified may be overcome by impressing upon the reactive coils counter magnetomotive forces of such value as to compensate for or counterbalance the magnetizing force due to the direct current flowing in the windings of the reactive coils, these counter magnetomotive forces being derived preferably, though not necessarily, from the current flowing over the neutral conductor. In applying this principle in practice I provide the reactive coils with supplemental or counter magnetizing-windings through which direct current from the neutral conductor is passed in such a direction as to counterbalance the magnetizing effect of the direct current in the windings of the reactive coils.

Figure 2:
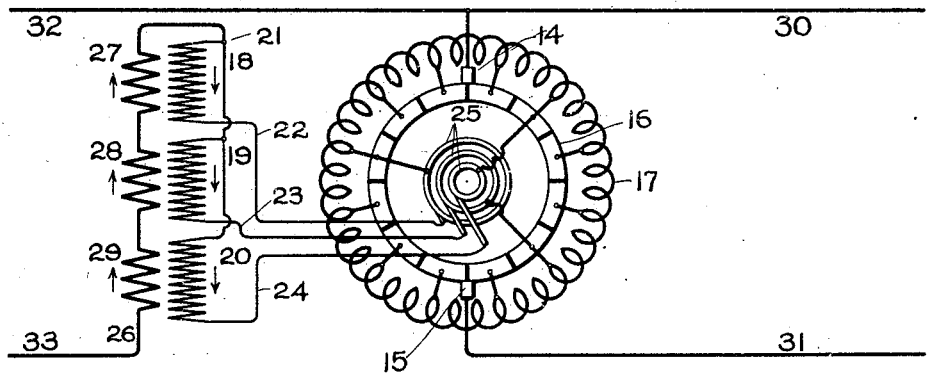

In the drawings, Figure 1 represents the application of my invention to a single-phase rotary converter. Fig. 2 shows an application of my invention for transforming direct current of one voltage into direct current of another voltage, the transformation being effected by the employment of a commutating-machine in connection with a combination of reactive coils arranged in accordance with my invention, so as to secure a point of neutral potential to which to connect one of the direct-current mains.

In Fig. 1 the armature-winding of the single-phase converter is shown at 1 and is connected in the usual manner to a commutator 2 and to a pair of collector-rings 3. Direct-current mains 4 5 extend from brushes bearing upon the commutator 2, while alternating-current mains 6 7 extend from brushes bearing on the collector-rings 3. Two reactive coils 8 9 are connected in series across the alternating-current mains 6 7. These reactive coils being as nearly as practicable identical in their electrical properties, it follows that the common connection 10 between these coils is of a potential neutral with respect to the potentials of the various points about the armature-winding 1. So long as no direct current flows along the neutral conductor 11, connected to this common connection 10, the cores of the reactive coils are magnetized solely by the alternating current passing through the windings 8 9. So soon, however, as direct current commences to flow in either direction through the neutral conductor 11 the resultant magnetizing effect in the coil 8 and in the coil 9 is due to the joint action of the superposed alternating and direct currents flowing in the respective windings. If no means were taken to prevent it, the increase in direct current would soon reach such a point as to cause saturation in the cores of the reactive coils, and thereby cause an excessive flow of alternating magnetizing-current. To prevent this result, I mount upon the cores of the coils 8 9 counter magnetizing-windings 12 and 13, respectively, through which coils the current from the neutral conductor 11 is passed in series. In the arrangement shown the windings 12 and 13 are in series with the conductor 11; but it is evident that any other suitable connection may be made. With the coils arranged in series, as shown, it is evident that the full neutral current flows in each coil, for which reason the magnetizing force per turn is double that of the magnetizing force per turn due to the direct current in the coil 8 9, since, as will be evident, the neutral current in the main 11 divides as it passes into the neutral point 10, half passing through the coil 8 and the other half through the coil 9. To produce an exact counterbalancing of the magnetizing force due to the direct current in the two windings on each of the two reactive coils, the additional windings 12 and 13 are made of a number of turns equal to half the number of turns in the coils 8 9 and of approximately twice the cross-section per turn, since they carry double the direct current flowing in the reactive coils 8 9. The connections are made so that the direct current flowing in the coils 12 13 magnetizes in the opposite direction from the direct current flowing in the reactive coils 8 9. The arrows placed beside the coils represent the direction of flow of currents for producing this result.

Fig. 2 shows an arrangement of commutating-machine suitable for transforming direct current of one voltage into direct current of another voltage. One set of mains, either the incoming or the outgoing, is connected to two brushes 14 15, bearing upon the commutator 16, connected to the armature-winding 17 of the direct-current converter. The other set of direct-current mains is connected one to one of the brushes 14 15 the other to a point of neutral potential obtained by connecting a number of reactive coils to suitably-spaced points in the armature-winding 17. The ratio of transformation is thus either from one to two or two to one, depending upon the selection of mains through which current is supplied to the direct-current converter. In the arrangement of reactive coils here shown I make use of three coils 18 19 20, having one end of each connected to a common point 21 and the remaining ends through leads 22 23 24 to an equal number of collector-rings 25, connected in three-phase relation to the armature-winding 17. Each of the reactive coils 18 19 20 is mounted upon a separate core and provided with a counter magnetizing-coil in inductive relation to it and through which current is passed from the direct-current main 26. These additional coils are represented at 27 28 29, respectively, and are of one-third the number of turns of the coils to which they are inductively related, since, owing to the fact that the current in the main 26 is divided into three parts in passing through the reactive coils 18 19 20, the current in each counter magnetizing-coil is therefore of three times the value of the direct current in the reactive coil to which it is inductively related. The cross-section of the wire of these additional coils is of course correspondingly increased to secure proper carrying capacity.

From what has been said it will be clear that current may be supplied over the mains 30 31 and then by the direct-current converter shown changed into direct current of one-half voltage but practically double volume, this current being conveyed away by the secondary mains 32 33, or the transformer may be reversed, direct current being supplied over the mains 32 and 33 and changed by the continuous-current converter into direct current of double voltage of practically half value, this current being then delivered over the mains 30 31.

It is obvious that my invention is capable of application in many other relations than those shown, for which reason I desire that my claims should be given a correspondingly-broad interpretation.

What I claim as new, and desire to secure by Letters Patent of the United States, is—

1. The combination with the armature-winding of a dynamo-electric machine, of a commutator connected to said winding, a plurality of interconnected coils, connections between said coils and points in said winding, a main leading to a connection between the coils, and counter magnetizing-coils traversed by current in said main.

2. The combination with the armature-winding of a dynamo-electric machine, of a commutator connected to said winding, a plurality of reactive coils connected in multiphase relation to points in said winding, a main leading to a connection between the coils, and counter magnetizing-coils in circuit with said main.

3. The combination with the armature-winding of a dynamo-electric machine, of a commutator connected to said winding, direct-current mains extending from said commutator, a plurality of reactive coils having separate cores, connections between said coils and points in said winding, a direct-current main leading to a connection between the coils, and counter magnetizing-coils in series with said main.

4. The combination of a dynamo-electric machine, a plurality of reactive coils having a terminal of each joined to a common point and their remaining terminals connected in multiphase relation to a winding on said dynamo-electric machine, and a counter magnetizing-coil inductively related to each reactive coil.

5. The combination of a dynamo-electric machine provided with a commutator, a plurality of coils having a terminal of each joined to a common point and their remaining terminals connected to points in the armature-winding of said machine, and a counter magnetizing-coil for each of said coils.

In witness whereof I have hereunto set my hand this 28th day of August, 1900.

CHARLES P. STEINMETZ.

Witnesses:
BENJAMIN B. HULL,
FRED RUSS.